United States Patent
Kwon et al.

(10) Patent No.: US 8,494,078 B2
(45) Date of Patent: Jul. 23, 2013

(54) METHOD FOR TRANSMITTING DATA IN WIRELESS COMMUNICATION SYSTEM

(75) Inventors: Yeong Hyeon Kwon, Anyang-si (KR); Seung Hee Han, Anyang-si (KR); Hyun Woo Lee, Anyang-si (KR); Sung Ho Moon, Anyang-si (KR); Jin Sam Kwak, Anyang-si (KR); Dong Cheol Kim, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 12/993,662

(22) PCT Filed: May 21, 2009

(86) PCT No.: PCT/KR2009/002674
§ 371 (c)(1),
(2), (4) Date: Nov. 19, 2010

(87) PCT Pub. No.: WO2009/142444
PCT Pub. Date: Nov. 26, 2009

(65) Prior Publication Data
US 2011/0090986 A1    Apr. 21, 2011

Related U.S. Application Data

(60) Provisional application No. 61/055,145, filed on May 22, 2008.

(30) Foreign Application Priority Data

Sep. 8, 2008   (KR) .................. 10-2008-0088014

(51) Int. Cl.
*H04B 7/06* (2006.01)

(52) U.S. Cl.
USPC .......................................... 375/267; 375/260

(58) Field of Classification Search
USPC .................. 375/260, 262, 265, 267; 370/208, 370/210
See application file for complete search history.

(56) References Cited

U.S. PATENT DOCUMENTS

| | | | |
|---|---|---|---|
| 2007/0014272 A1 | 1/2007 | Palanki et al. | |
| 2007/0248113 A1* | 10/2007 | Ko et al. | 370/436 |
| 2009/0303918 A1* | 12/2009 | Ma et al. | 370/315 |
| 2010/0182975 A1* | 7/2010 | Malladi et al. | 370/330 |

FOREIGN PATENT DOCUMENTS

| WO | WO 2004-093365 A2 | 10/2004 |
|---|---|---|
| WO | WO 2008-048056 A1 | 4/2008 |

* cited by examiner

*Primary Examiner* — Young T. Tse
(74) *Attorney, Agent, or Firm* — McKenna, Long & Aldridge, LLP.

(57) ABSTRACT

A data transmission method in a wireless communication system is provided. The method includes allocating a plurality of pilot resources for supporting pilot transmission through a plurality of antennas, and if there are residue pilot resources not used in the pilot transmission among the plurality of pilot resources, transmitting data by using the residue pilot resources.

7 Claims, 15 Drawing Sheets

FIG. 12

| 1 | 2 | 3 | 4 | 1 | 2 | 3 | 4 | 1 | 2 | 3 | 4 | 1 | 2 | 3 | 4 |

[1] 1st ANTENNA
[2] 2nd ANTENNA
[3] 3rd ANTENNA
[4] 4th ANTENNA

METHOD FOR TRANSMITTING DATA IN WIRELESS COMMUNICATION SYSTEM

This application claims the benefit of priority of U.S. Provisional Application No. 61/055,145 filed on May 22, 2008, Korean Patent Application No. 10-2008-0088014 filed on Sep. 8, 2008 and PCT Application No. PCT/KR2009/002674 filed May 21, 2009, all of which are incorporated by reference in their entirety herein.

TECHNICAL FIELD

The present invention relates to wireless communications, and more particularly, to a data transmission method in a wireless communication system.

BACKGROUND ART

In next generation multimedia mobile communication systems, which have been actively studied in recent years, there is a demand for a system capable of processing and transmitting a variety of information (e.g., video and radio data) at a higher data rate in addition to the early-stage voice service. Further, a 3rd generation wireless communication system is followed by a 4th generation wireless communication which is currently being developed aiming at support of a high-speed data service of 1 gigabits per second (Gbps) in downlink and 500 megabits per second (Mbps) in uplink. Furthermore, the wireless communication system is designed for the purpose of providing reliable communication to a plurality of users irrespective of their locations and mobility. However, a wireless channel has an abnormal characteristic such as a fading phenomenon caused by a path loss, noise, and multi-path, an inter-symbol interference (ISI), a Doppler effect caused by mobility of a mobile station (MS), etc. Various techniques have been developed to overcome the abnormal characteristic of the wireless channel and to increase reliability of wireless communication.

Orthogonal frequency division multiplexing (OFDM), multiple input multiple output (MIMO), etc., are techniques for supporting reliable high-speed data services.

An OFDM system capable of reducing an ISI effect with a low complexity is taken into consideration as one of post-3rd generation wireless communication systems. In the OFDM, a serially input data symbol is converted into N parallel data symbols, and is then transmitted by being carried on N separate subcarriers. The subcarriers maintain orthogonality in a frequency dimension.

A MIMO technique improves data transmission/reception efficiency by using multiple transmit (Tx) antennas and multiple receive (Rx) antennas. Examples of the MIMO technique include spatial multiplexing, transmit diversity, beamforming, etc. A MIMO channel matrix depending on the number of Rx antennas and the number of Tx antennas can be decomposed into a plurality of independent channels. Each independent channel is referred to as a layer or a stream. The number of layers is referred to as a rank.

In order to restore data transmitted from a transmitter, a receiver needs to perform channel estimation. The channel estimation is defined as a process in which a distorted signal is restored by compensating for signal distortion when fading occurs due to rapid environmental changes. In general, the channel estimation requires a pilot known to both the transmitter and the receiver. Since the MIMO system experiences a channel corresponding to each antenna, there is a need to arrange pilots by considering multiple antennas. Therefore, a pilot overhead significantly increases in a pilot structure for supporting MIMO. The pilot overhead can be defined by a ratio of the number of subcarriers allocated to a pilot to the total number of subcarriers. When the pilot overhead is great, there is a problem of the decrease in the number of data subcarriers used for data transmission. This results in the decrease in a data throughput and the decrease in spectral efficiency. As a result, overall system capability may deteriorate.

However, a system supporting MIMO can use either some of a plurality of antenna resources or only one antenna resource. Examples of a case where pilot resources cannot be sufficiently utilized include a case where an MS existing in a location causing the most significant interference to a neighboring cell transmits a signal to the neighboring cell with a different MIMO configuration, a case where a spatial multiplexing or a diversity gain cannot be attained due to a high correlation between antenna channels, a case where MSs having different antenna configurations are scheduled by grouping them in a virtual MIMO manner, a case where a pilot structure of a macro cell is used when a channel property is excellent in a small cell such as a femto cell, etc. In this case, there may be a problem in that resources allocated to the pilots cannot be entirely utilized in a pilot structure having a great overhead.

Accordingly, there is a need for a data transmission method capable of effectively utilizing radio resources allocated to pilots when using a pilot structure supporting multiple antennas.

DISCLOSURE

Technical Problem

The present invention provides a data transmission method capable of effectively utilizing radio resources.

Technical Solution

In an aspect, a data transmission method in a wireless communication system is provided. The method includes allocating a plurality of pilot resources for supporting pilot transmission through a plurality of antennas, and if there are residue pilot resources not used in the pilot transmission among the plurality of pilot resources, transmitting data by using the residue pilot resources.

In another aspect, a data transmission method in a wireless communication system is provided. The method includes allocating a plurality of pilot resources for supporting pilot transmission through a plurality of antennas, if there are residue pilot resources not used in the pilot transmission among the plurality of pilot resources, dividing the residue pilot resources into a first transmission zone and a second transmission zone, mapping first data whose bandwidth is spread by using a first spreading sequence to the first transmission zone, mapping second data whose bandwidth is spread by using a second spreading sequence to the second transmission zone, and transmitting each of the first data and the second data.

Advantageous Effects

A data transmission method capable of effectively utilizing radio resources can be provided. Therefore, overall system capability can be improved.

DESCRIPTION OF DRAWINGS

FIG. 12 shows a logical pilot resource unit stream as a collection of resource units allocated to pilots in a basic unit.

MODE FOR INVENTION

Figure 1:
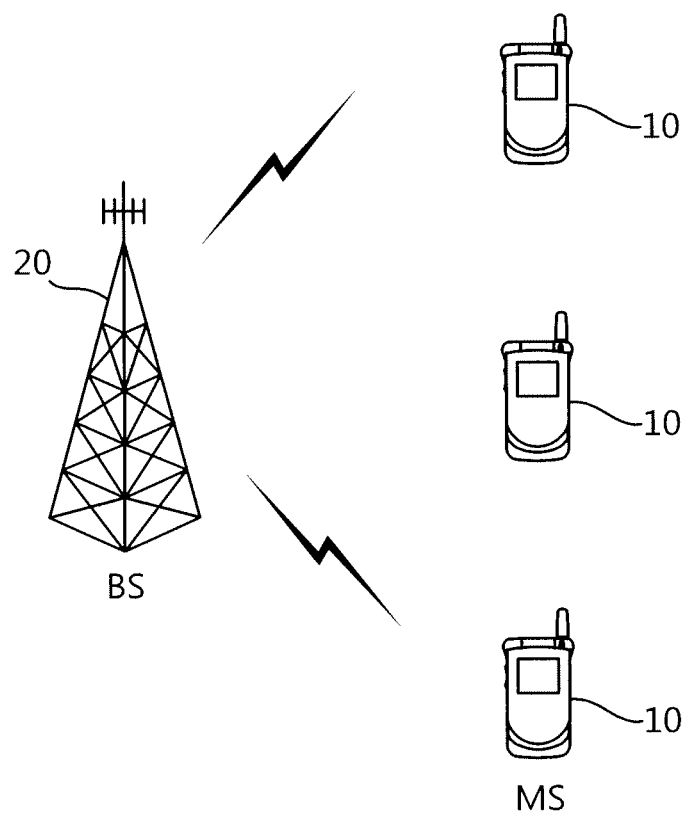
FIG. 1 shows a wireless communication system.

FIG. 1 shows a wireless communication system.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, etc. The BS 20 is generally a fixed station that communicates with the MS 10 and may be referred to as another terminology, such as an evolved node-B (eNB), a base transceiver system (BTS), an access point, etc. There are one or more cells within the coverage of the BS 20. The cell is an area in which the BS 20 provides a communication service. In genera, a downlink is defined as a communication link from the BS 20 to the MS 10, and an uplink is defined as a communication link from the MS 10 to the BS 20.

The wireless communication system may be any one of a multiple input multiple output (MIMO) system, a multiple input single output (MISO) system, a single input single output (SISO) system, and a single input multiple output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna denotes a physical or logical antenna used for transmission of one signal or stream. The Rx antenna denotes a physical or logical antenna used for reception of one signal or stream.

There is no restriction in the multiple-access modulation scheme. Thus, well-known schemes can be used as the multiple-access modulation scheme, such as time division multiple access (TDMA), frequency division multiple access (FDMA), code division multiple access (CDMA), single carrier-frequency division multiple access (SC-FDMA), orthogonal frequency division multiple access (OFDMA), or the like.

Figure 2:
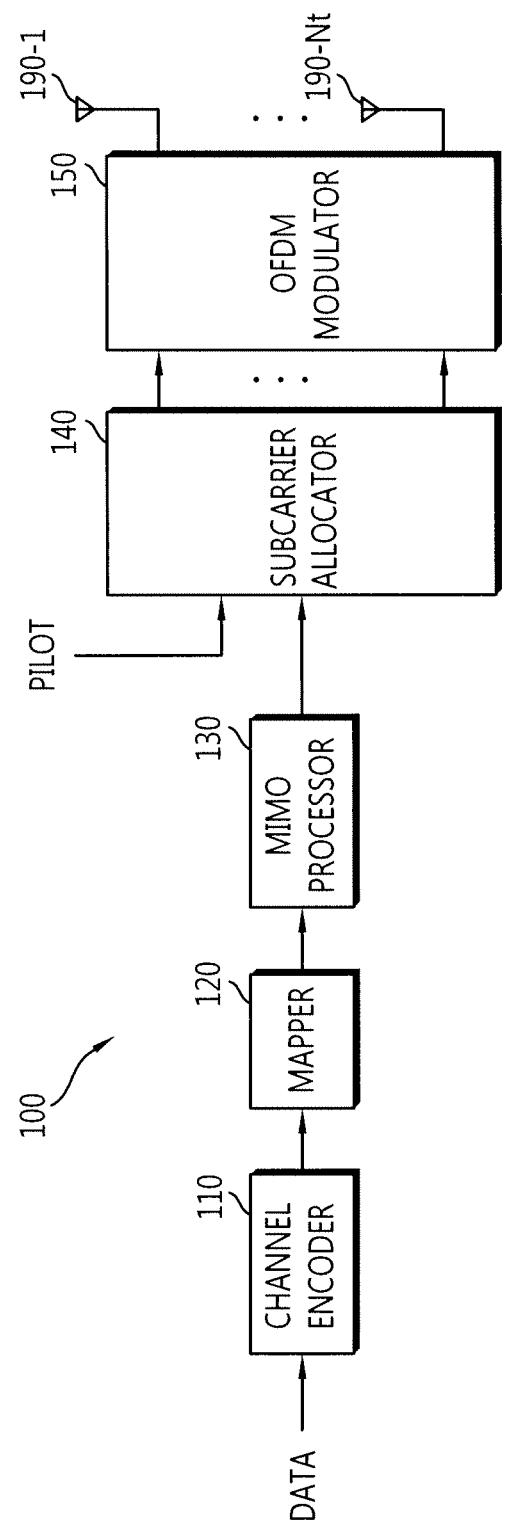
FIG. 2 is a block diagram showing a transmitter having multiple antennas.

FIG. 2 is a block diagram showing a transmitter having multiple antennas.

Referring to FIG. 2, a transmitter 100 includes a channel encoder 110, a mapper 120, a MIMO processor 130, a subcarrier allocator 140, and an orthogonal frequency division multiplexing (OFDM) modulator 150. The channel encoder 110 encodes an input stream according to a predetermined coding scheme to generate a coded word. The mapper 120 maps the coded word to a symbol that represents a position on a signal constellation. There is no limitation in a modulation scheme of the mapper 120. The modulation scheme may be m-phase shift keying (m-PSK) or m-quadrature amplitude modulation (m-QAM). The MIMO processor 130 processes an input symbol by using an MIMO scheme according to Tx antennas 190-1, . . . , 190-Nt. For example, the MIMO processor 130 may handle codebook-based pre-coding.

The subcarrier allocator 140 allocates an input symbol and a pilot to a subcarrier. The pilot is deployed to each of Tx antennas 190-1, . . . , 190-Nt. The pilot is a signal known to both the transmitter 100 and a receiver 200 of FIG. 3 and is used to channel estimation or data demodulation. The pilot is also referred to as a reference signal. The OFDM modulator 150 performs OFDM-modulation on the input symbol to output an OFDM symbol. The OFDM modulator 150 may perform inverse fast Fourier transform (IFFT) on the input symbol. After performing the IFFT, the OFDM modulator 150 may further insert a cyclic prefix (CP). The OFDM symbol is transmitted through each of the Tx antennas 190-1, . . . , 190-Nt.

Figure 3:
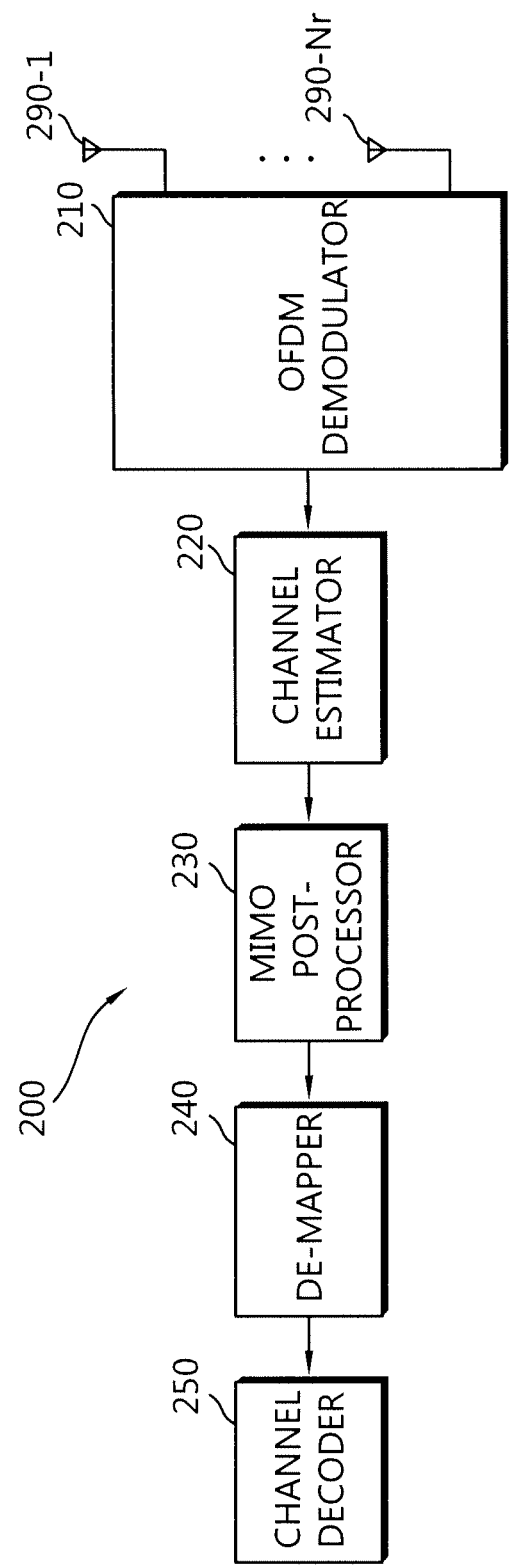
FIG. 3 is a block diagram showing a receiver having multiple antennas.

FIG. 3 is a block diagram showing a receiver having multiple antennas.

Referring to FIG. 3, a receiver 200 includes an OFDM demodulator 210, a channel estimator 220, an MIMO post-processor 230, a de-mapper 240, and a channel decoder 250. A signal received from receive antennas 290-1, . . . , 290-Nr is subject to fast Fourier transform (FFT) by the OFDM demodulator 210. The channel estimator 220 estimates a channel by using a pilot. The MIMO post-processor 230 performs post-processing corresponding to the MIMO processor 130. The de-mapper 240 de-maps the input symbol to a coded word. The channel decoder 250 decodes the coded word to restore original data.

Figure 4:
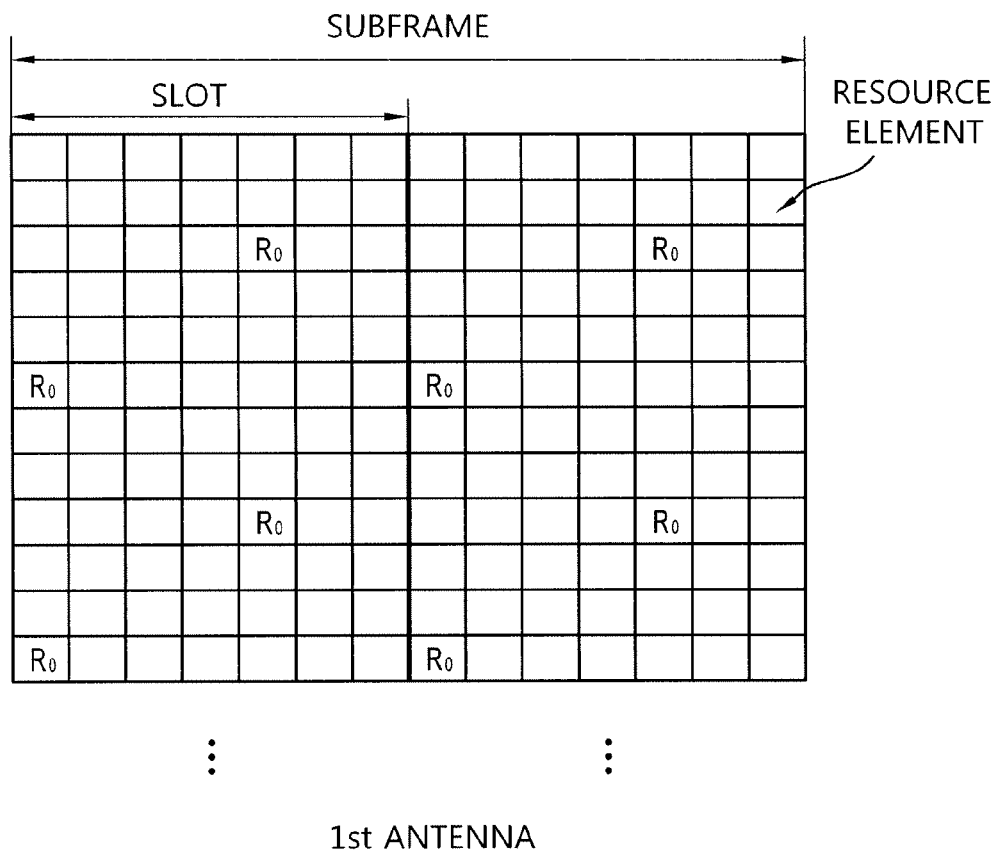
FIG. 4 shows an example of a downlink pilot pattern in a resource block when using one antenna.
Figure 5:
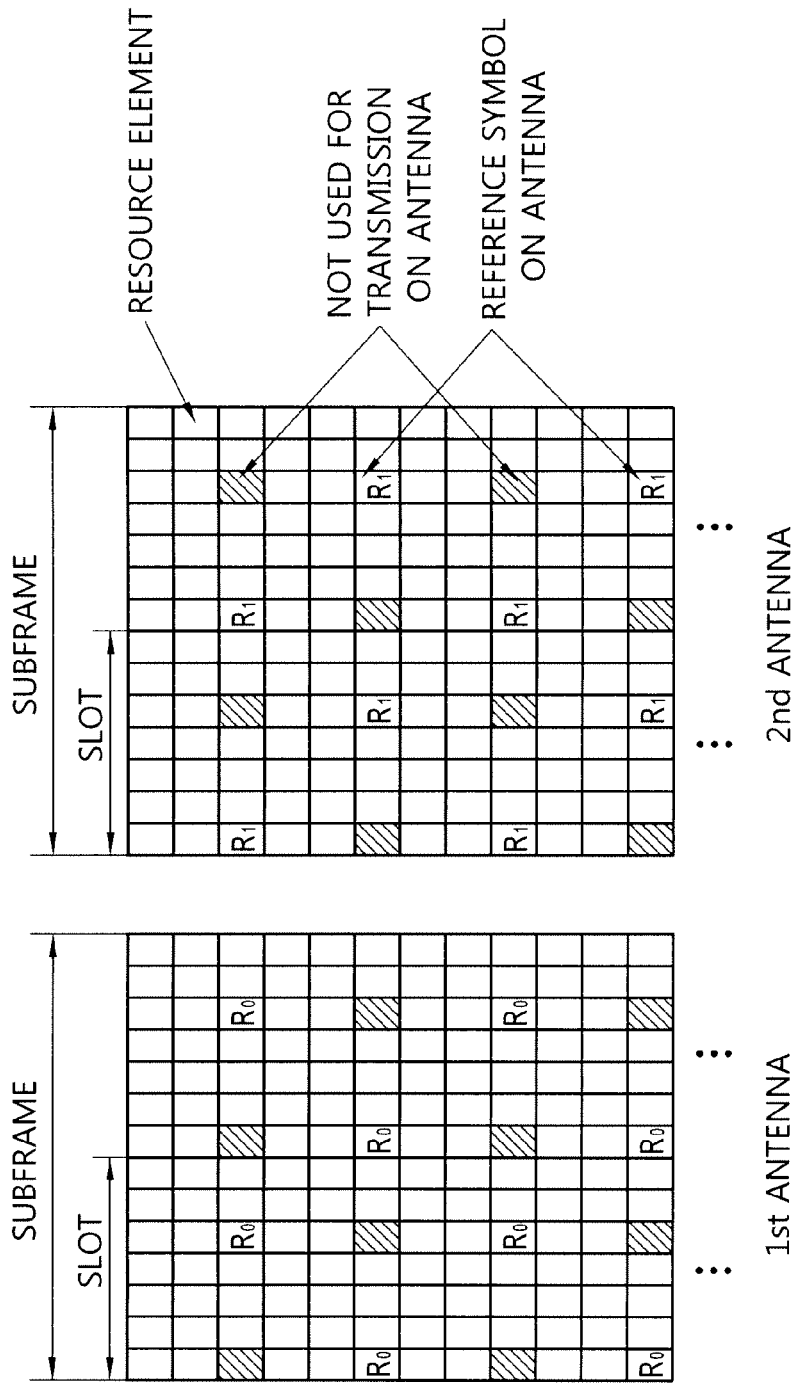
FIG. 5 shows an example of a downlink pilot pattern in a resource block when using two antennas.
Figure 6:
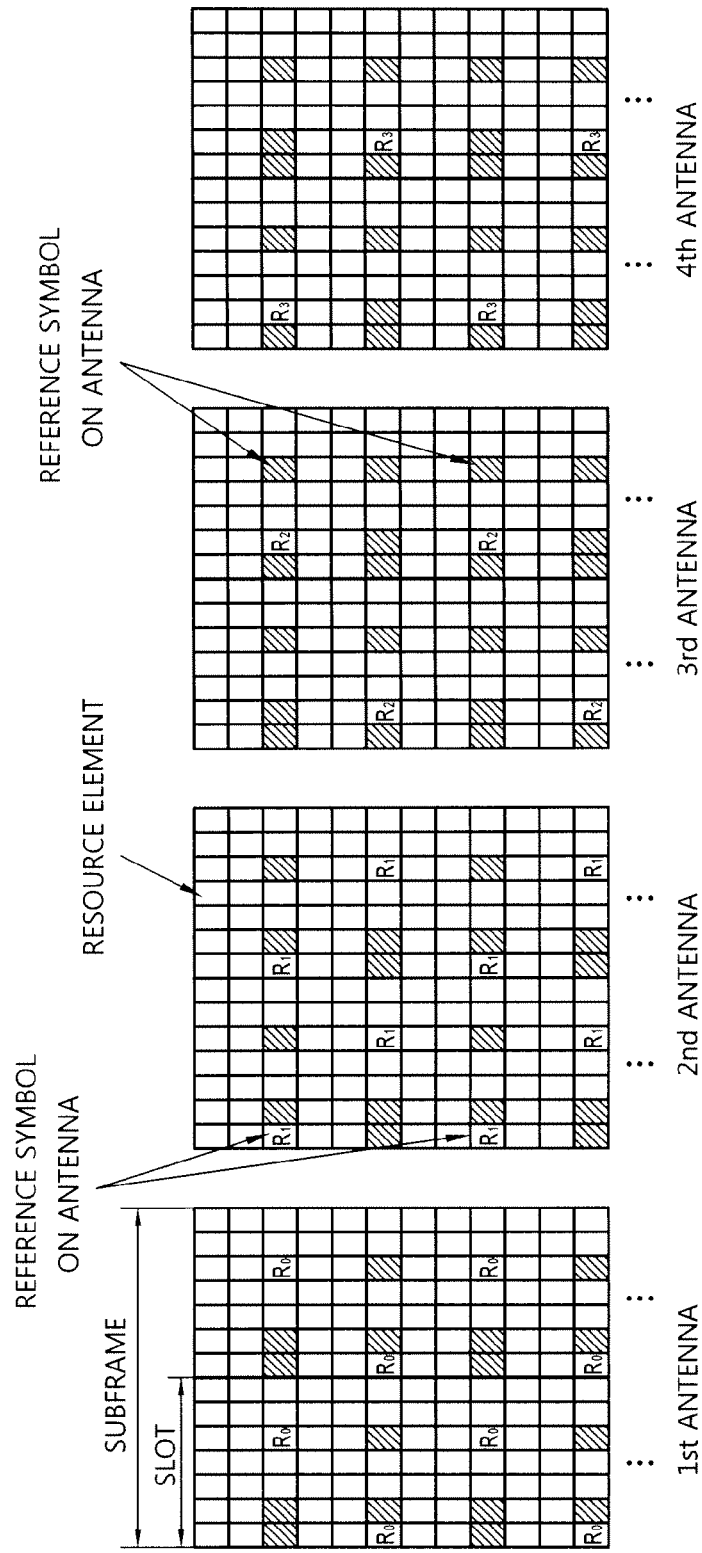
FIG. 6 shows an example of a downlink pilot pattern in a resource block when using four antennas.

FIG. 4 shows an example of a downlink pilot pattern in a resource block (RB) when using one antenna. FIG. 5 shows an example of a downlink pilot pattern in an RB when using two antennas. FIG. 6 shows an example of a downlink pilot pattern in an RB when using four antennas. The section 6.10.1 of 3rd Generation Partnership Project (3GPP) TS 36.211 V8.2.0 (2008-03) Technical Specification Group Radio Access Network; Evolved Universal Terrestrial Radio Access (E-UTRA); Physical Channels and Modulation (Release 8) can be incorporated herein by reference.

Referring to FIG. 4 to FIG. 6, one subframe consists of two slots. A time required to transmit one subframe is defined as a transmission time interval (TTI). For example, one subframe may have a length of 1 milliseconds (ms), and one slot may have a length of 0.5 ms. A downlink slot includes a plurality of OFDM symbols in a time domain, and includes a plurality of RBs in a frequency domain. The number of RBs included in the downlink slot in the frequency domain depends on a downlink transmission bandwidth defined in a cell. Although it is described herein that one downlink slot includes 7 OFDM symbols in the time domain and one RB includes 12 subcarriers in the frequency domain, this is for exemplary purposes only, and thus the present invention is not limited thereto. Each element on the RB is called a resource element. One RB includes 12×7 resource elements. Rp denotes a reference symbol of a (p+1)th antenna (where p=0, 1, 2, 3).). FIG. 4 shows an example of an RB structure that the reference symbol r0 of a single antenna is used. FIG. 5 shows an example of an RB structure that the reference symbol r0 and r1 of two antennas respectively are used. FIG. 6 shows an example of an RB structure that the reference symbol r0 to r3 of four antennas respectively are used. The reference symbol is a resource element used for pilot transmission. R0 to R3 are allocated without overlapping. On the (p+1)th antenna, reference symbols of other antennas are not used in transmission. For example, on a 4th antenna, R0 to R2 are not used in transmission. A downlink pilot is used for channel estimation of an MS. Further, the downlink pilot is also used in data demodulation.

Figure 7:
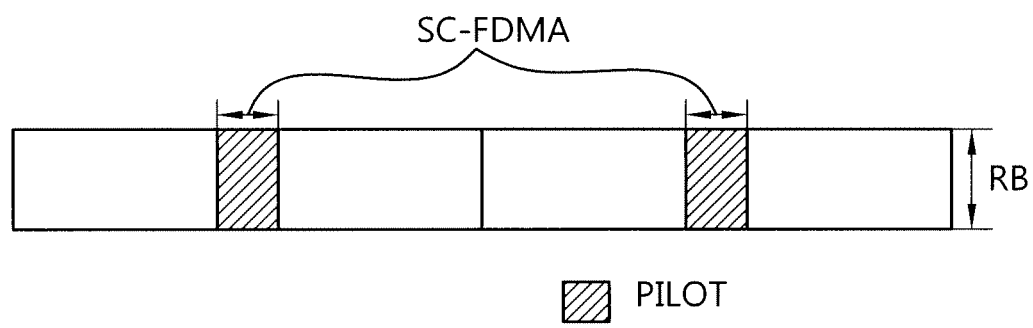
FIG. 7 shows an example of an uplink pilot pattern in a subframe of a 3rd generation partnership project (3GPP) evolved universal terrestrial radio access (E-UTRA) system.

FIG. 7 shows an example of an uplink pilot pattern in a subframe of a 3GPP E-UTRA system. E-UTRA is also called long term evolution (LTE).

Referring to FIG. 7, one subframe consists of 2 uplink slots. The uplink slot includes a plurality of SC-FDMA symbols in a time domain, and includes a plurality of RBs in a frequency domain. An uplink pilot is used by an amount of RBs allocated to one SC-FDMA. In this pilot pattern, a pilot overhead is constant irrespective of the number of antennas.

Figure 8:
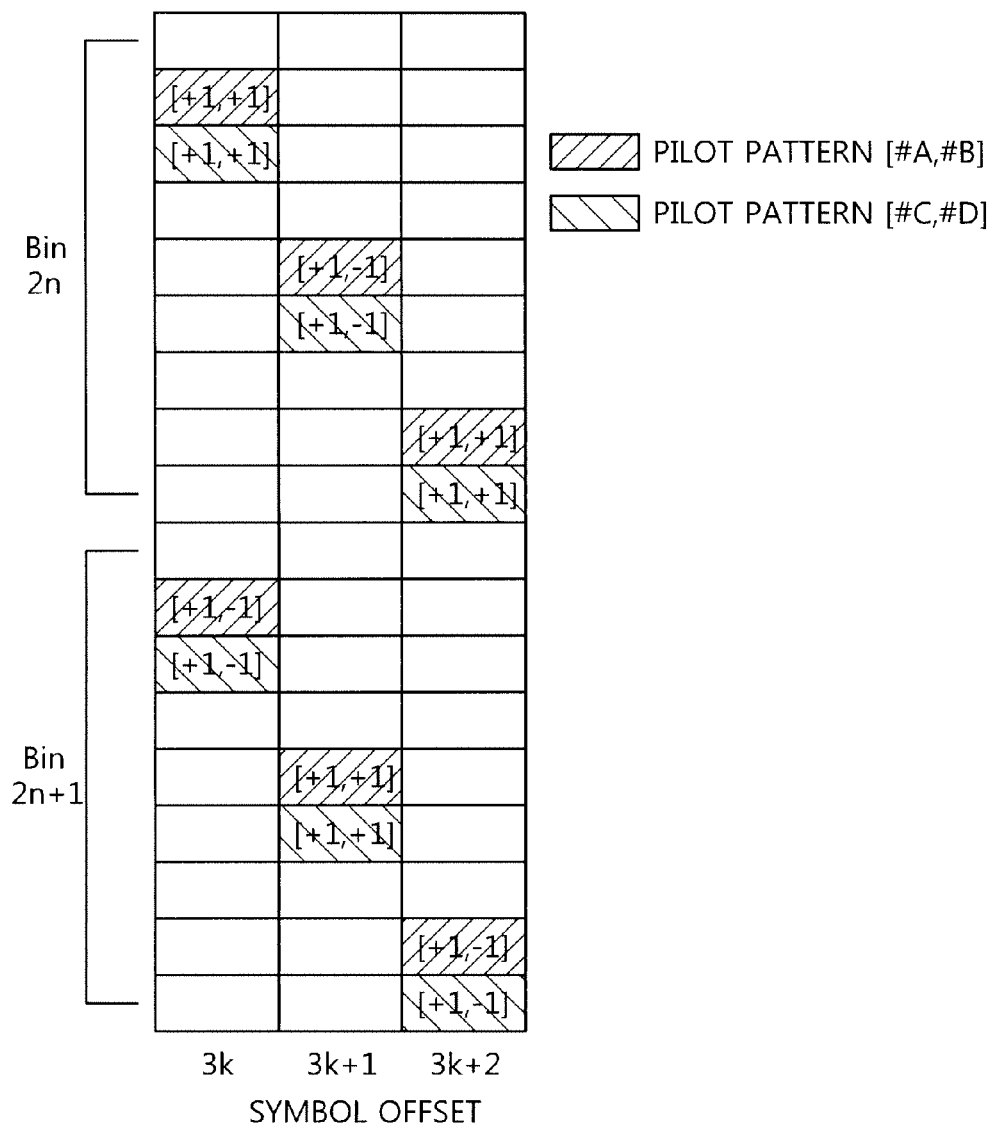
FIG. 8 shows an example of a pilot pattern for an adaptive antenna system (AAS) mode in an adaptive modulation and coding (AMC) zone.

FIG. 8 shows an example of a pilot pattern for an adaptive antenna system (AAS) mode in an adaptive modulation and coding (AMC) zone. The section 8.4.6.3.3 of IEEE (Institute of Electrical and Electronics Engineers) standard 802.16-2004 "Part 16: Air Interface for Broadband Wireless Access Systems" may be incorporated herein by reference.

The AMC zone is an area in which an AMC permutation rule is used in a downlink subframe or an uplink subframe. Permutation denotes mapping of a logical sub-channel onto a physical subcarrier. The sub-channel includes a plurality of subcarriers. The number of subcarriers per sub-channel differs according to a permutation rule. The AAS is a system which adaptively uses one or more antennas to improve transmission coverage and system capacity.

Referring to FIG. 8, the AMC zone includes 3 OFDM symbols in a time domain and includes 2 bins in a frequency domain. The bin consists of 9 contiguous physical subcarriers on one OFDM symbol. In the AMC zone, a pilot pattern is configured with a location and a polarity. A polarity of each pilot pattern is indicated by "[ ]". A symbol offset is relative to the beginning of the AMC zone.

A pilot structure is actively being under discussion in IEEE 802.16m which is being under study as a 4th generation wireless communication technique. It is expected that a pilot structure supporting MIMO has a significantly great pilot overhead in the IEEE 802.16m.

It is assumed hereinafter that a transmitter can transmit data in a subframe unit for each Tx antenna. The transmitter may be either a BS or an MS. A subframe is a data sequence used according to a physical specification in a fixed time duration. The subframe may include at least one basic unit. The basic unit is hereinafter defined as a unit of pilot allocation. For example, the basic unit is an RB in FIG. 4 to FIG. 6. The basic unit includes a plurality of OFDM symbols in a time domain, and includes a plurality of subcarriers in a frequency domain. Each unit on the basic unit is called a resource unit. The resource unit on the basic unit may be allocated for pilot transmission, or may be allocated for data transmission.

Hereinafter, an example of a pilot pattern supporting 4 antennas in the basic unit will be described. In an uplink scenario, one MS may use 4 antennas, or 4 MSs may each use one antenna. The latter case is called virtual MIMO. For example, one basic unit includes 6 OFDM symbols in a time domain and includes 6 subcarriers in a frequency domain. That is, one basic unit includes 6×6 resource units. However, this is for exemplary purposes only, and thus the number of OFDM symbols constituting one subframe, the number of subcarriers, and the number of resource units are not limited thereto. For clarity of explanation, the 6 OFDM symbols are sequentially called a 1st OFDM symbol, a 2nd OFDM symbol, . . . , a 6th OFDM symbol. In addition, the 6 subcarriers are sequentially called a 1st subcarrier, a 2nd subcarrier, . . . , a 6th subcarrier.

Figure 9:
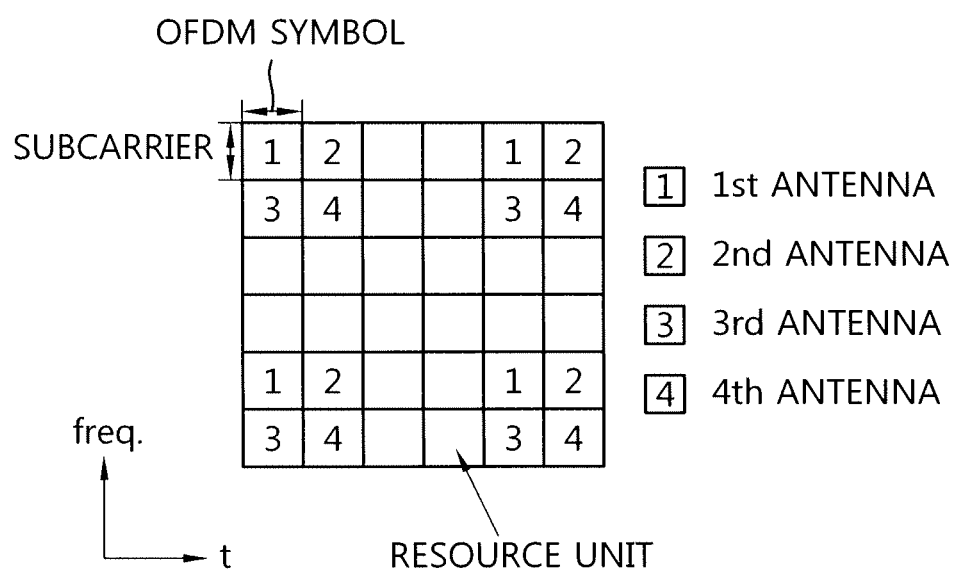
FIG. 9 shows an example of a pilot pattern for four antennas in a basic unit.

FIG. 9 shows an example of a pilot pattern for 4 antennas in a basic unit.

Referring to FIG. 9, a pilot for a 1st antenna is allocated to a 1st subcarrier and a 5th subcarrier in a 1st OFDM symbol and a 5th OFDM symbol. A pilot for a 2nd antenna is allocated to a 1st subcarrier and a 5th subcarrier in a 2nd OFDM symbol and a 6th OFDM symbol. A pilot for a 3rd antenna is allocated to a 2nd subcarrier and a 6th subcarrier in the 1st OFDM symbol and the 5th OFDM symbol. A pilot for a 4th antenna is allocated to a 2nd subcarrier and a 6th subcarrier in the 2nd OFDM symbol and the 6th OFDM symbol. In this case, a resource unit allocated to a pilot does not overlap for each antenna in the basic unit. This is a case where a plurality of pilot resources differently use physical subcarriers.

Figure 10:
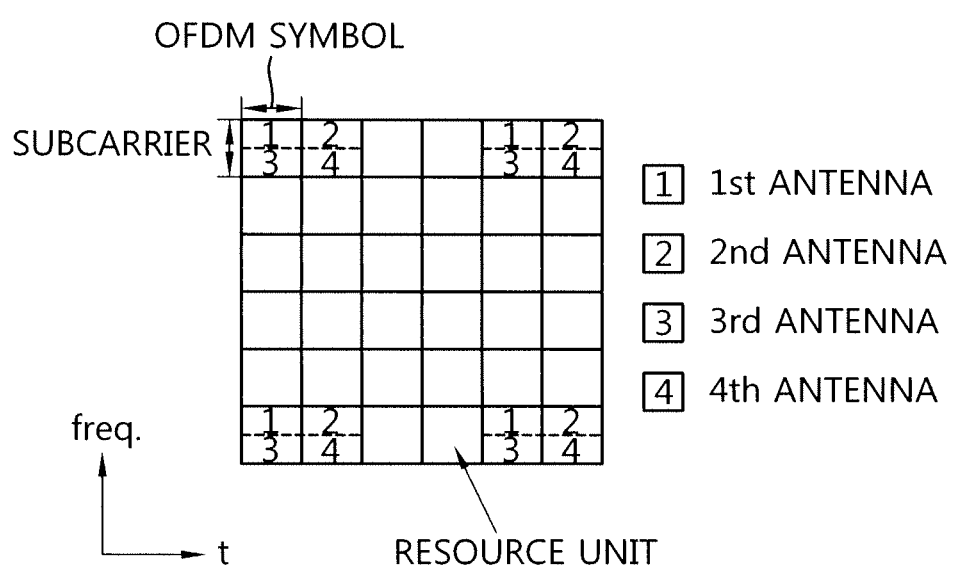
FIG. 10 shows another example of a pilot pattern for four antennas in a basic unit.

FIG. 10 shows another example of a pilot pattern for 4 antennas in a basic unit.

Referring to FIG. 10, a pilot for a 1st antenna and a 3rd antenna is allocated to a 1st subcarrier and a 6th subcarrier in a 1st OFDM symbol and a 5th OFDM symbol. A pilot for a 2nd antenna and a 4th antenna is allocated to a 1st subcarrier and a 6th subcarrier in a 2nd OFDM symbol and a 6th OFDM symbol. In this case, a resource unit allocated to a pilot may overlap between the antennas in the basis unit. This is a case where a plurality of pilot resources can use the same subcarrier.

Figure 11:
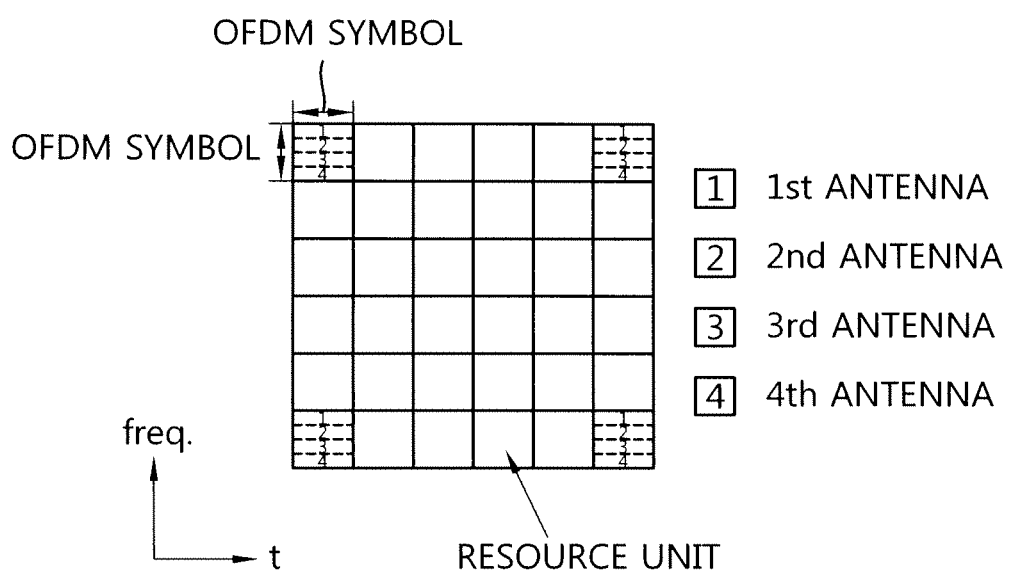
FIG. 11 shows another example of a pilot pattern for four antennas in a basic unit.

FIG. 11 shows another example of a pilot pattern for 4 antennas in a basic unit.

Referring to FIG. 11, a pilot for a 1st antenna and a 4th antenna is allocated to a 1st subcarrier and a 6th subcarrier in a 1st OFDM symbol and a 6th OFDM symbol. In this case, a resource unit allocated to a pilot is identical for each antenna in the basis unit. This is a case where a plurality of pilot resources use the same subcarrier.

As such, a pilot structure supporting MIMO can be divided for two cases, i.e., a case where a plurality of pilot resources differently use subcarriers and a case where the plurality of pilot resources use the same subcarrier.

First, the case where the plurality of pilot resources differently use the subcarriers will be described. In this case, a pilot overhead increases, but channel estimation can be precisely performed. When an interference of a neighbor cell can be ignored, a signal-to-interference-and-noise ratio (SINR) increases and thus channel estimation can be performed more precisely. However, when only some of pilot resources are used instead of using all of the plurality of pilot resources, there is remaining subcarriers. The remaining subcarrier resources may be used for data transmission.

Next, the case where the plurality of pilot resources use the same subcarrier will be described. In this case, the plurality of antennas transmit pilots by using the same subcarrier. To identify a pilot transmitted through each antenna, a specific pilot sequence is allocated to each antenna. A channel of each antenna is estimated using a specific pilot sequence allocated for each antenna. In channel estimation, the channel is generally assumed to be a flat fading channel which is flat over time or frequency. The longer the pilot sequence length, the higher the accuracy of channel estimation. However, if only some of the plurality of antennas are used instead of using all of them, pilot sequences allocated to unused antennas cause waste of resources. This is a case where some subcarriers cannot be utilized for data transmission unlike in the case where the plurality of pilot resources differently use the subcarriers. Such a pilot structure is used in uplink of 3GPP LTE described in FIG. 7.

If some of the plurality of pilot resources are not used in the aforementioned pilot structure supporting MIMO, radio resources are wasted. In general, a plurality of MSs in a cell use the same pilot structure, but each MS can be configured with a different antenna mode. For example, two MSs may share a pilot structure supporting 4 antennas, while one MS uses 4 antennas and the other MS uses one antenna. In this case, the MS which uses one antenna cannot entirely use a resource allocated to a pilot. This causes a problem in that limited radio resources are ineffectively used. Downlink pilots are commonly used by all of the plurality of MSs. Uplink pilots are exclusively used by a particular MS or may be shared by other MSs in a virtual MIMO manner. Therefore, in case of the uplink pilot, it is more easy to change a usage of the resource allocated to the pilot. In particular, since a pilot is defined as all of specific OFDM symbols in 3GPP LTE, pilot resources used and defined in a cell according to the number of antennas are used by reserving the pilot resources by up to the maximum number of antennas supported in the cell. However, there is a case where some pilot resources remain according to capability of a MS actually in use.

When a transmitter uses a smaller number of antennas than the number of antennas based on a pilot allocated to a basic unit, it is effective to utilize unused pilot resources for other usages. Therefore, in case of a pilot resource structure supporting multiple antennas, there is a need to provide a data transmission method capable of effectively using a resource allocated to a pilot. Hereinafter, a method of using a resource allocated to a pilot will be described for a case where a plurality of pilot resources differently use subcarriers and a case where the plurality of pilot resources use the same subcarrier in a pilot resource structure supporting multiple antennas.

(1) When a Plurality of Pilot Resources Differently Use Subcarriers

FIG. 12 shows a logical pilot resource unit stream as a collection of resource units allocated to pilots in a basic unit. The logical pilot resource unit stream is used for 4 Tx antennas, and may vary depending on the number of Tx antennas. The pilot resource unit stream is irrelevant to an actual pilot structure.

Referring to FIG. 12, the pilot resource unit stream is arranged starting from one resource unit for a 1st antenna to one resource unit for a 4th antenna, and is again arranged starting from one resource unit for the 1st antenna to one resource unit for the 4th antenna. A plurality of resource units corresponding to the same antenna in the pilot resource unit stream may be arranged according to an order of OFDM symbols or an order of subcarriers. The pilot resource unit stream of FIG. 12 is only for exemplary purposes only, and does not restrict an order of resource units constituting the pilot resource unit stream.

A resource unit allocated to a pilot can be easily changed to a resource unit for data transmission. When using a smaller number of antennas than the maximum number of supportable antennas, the resource unit allocated to the pilot can be used for data transmission with respect to some of the antennas. By flexibly using the resource unit, limited radio resources can be used effectively. Hereinafter, a resource unit allocated to a pilot with respect to some of unused antennas is called a residue resource unit.

Data that can be transmitted in the residue resource unit may be user data or control information. In particular, it is very effective to transmit a small amount of control information by using the residue resource unit. Examples of the control information include scheduling related control, acknowledgement (ACK)/negative acknowledgment (NACK), a channel quality indicator (CQI), power control, interference indication, multicarrier related control, etc.

Data may be transmitted using one residue resource unit, or may be transmitted using a plurality of residue resource units.

Transmission using one residue resource unit is equivalent to transmission of data in a subcarrier unit. This is equivalent to the use of subcarrier in data traffic. In this case, a data signal delivered in the subcarrier unit can be transmitted by using a non-coherent method or a coherent method. The non-coherent method is a method in which a receiving end determines a signal by detecting a sequence itself which is an information bit-stream. The coherent method is a method in which the receiving end detects a signal modulated to a sequence by performing channel estimation by the use of a reference signal. The non-coherent method can process a signal directly without having to wait until a channel estimation result is obtained. On the other hand, the coherent method performs demodulation after channel estimation, and thus can deliver a more amount of information. According to a combination of control signals, some of signals may be transmitted in a non-coherent manner, and other signals, if exist, may be additionally transmitted in a coherent manner. In addition, a coherent-type signal and a non-coherent-type signal may be transmitted and transmitted.

Transmission using a plurality of residue resource units is equivalent to transmission of data by using a subcarrier subset. The data may be transmitted by using all of the plurality of residue resource units in the basic unit. Alternatively, the plurality of residue resource units in the basic unit may be divided into a 1st transmission zone, a 2nd transmission zone, . . . , an Nth transmission zone (where N is a natural number), so that the data can be transmitted in each transmission zone. By delivering the data by using the subcarrier subset, a spreading gain can be provided to the data, or interference can be removed. Therefore, a method of transmitting the data by using the subcarrier subset can be used in data transmission which requires a higher quality of service (QoS).

Figure 13:
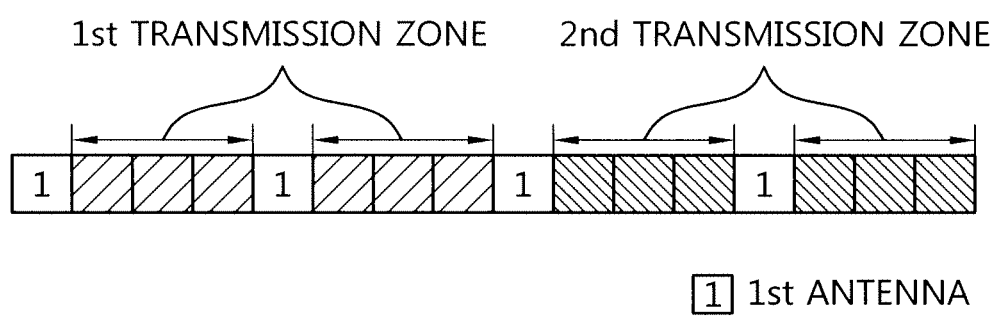
FIG. 13 shows a case where a plurality of residue resource units are divided into a 1st transmission zone and a 2nd transmission zone in a logical pilot resource unit with respect to four transmit antennas.

FIG. 13 shows a case where a plurality of residue resource units are divided into a 1st transmission zone and a 2nd transmission zone in a logical pilot resource unit with respect to 4 Tx antennas. This is for exemplary purposes only, and thus the plurality of residue resource units in a basic unit can be divided into a 1st transmission zone, a 2nd transmission zone, . . . , an Nth transmission zone (where N is a natural number). It is assumed that a transmitter uses only a 1st antenna and does not use 2nd to 4th antennas.

Referring to FIG. 13, a pilot resource unit stream is divided into a 1st transmission zone and a 2nd transmission zone by 6 resource units among resource units for the 2nd to 4th antennas. The 1st transmission zone is used for 1st data transmission, and the 2nd transmission zone is used for 2nd data transmission.

A spreading sequence may be used to spread data transmitted through the transmission zone. Further, the spreading sequence may also be used to identify data transmitted through each transmission zone. A pilot sequence used in the antenna may be re-used as the spreading sequence. However, the pilot sequence may not be used as the spreading sequence because of its length or other equivalent reasons. When the spreading sequence is used for each transmission zone, spreading sequences used for the respective transmission zones may use a low cross correlation sequence or an orthogonal sequence. For example, the spreading sequence may be a Walsh sequence, an m-sequence, a constant amplitude zero auto-correlation (CAZAC) sequence, etc.

1st data may be spread in bandwidth by using a 1st spreading sequence, and may be mapped to the 1st transmission zone. 2nd data may be spread in bandwidth by using a 2nd spreading sequence, and may be mapped to the 2nd transmission zone. In this case, as the 1st spreading sequence and the 2nd spreading sequence, orthogonal sequences or low cross correlation sequences may be used.

When transmitting a signal by using a subcarrier subset, the signal may be transmitted by using a non-coherent method or a coherent method, similarly to the signal delivered in a subcarrier unit. According to a combination of control signals, some of signals may be transmitted in a non-coherent manner, and other signals, if exist, may be additionally transmitted in a coherent manner. In addition, a coherent-type signal and a non-coherent-type signal may be combined and transmitted.

Figure 14:
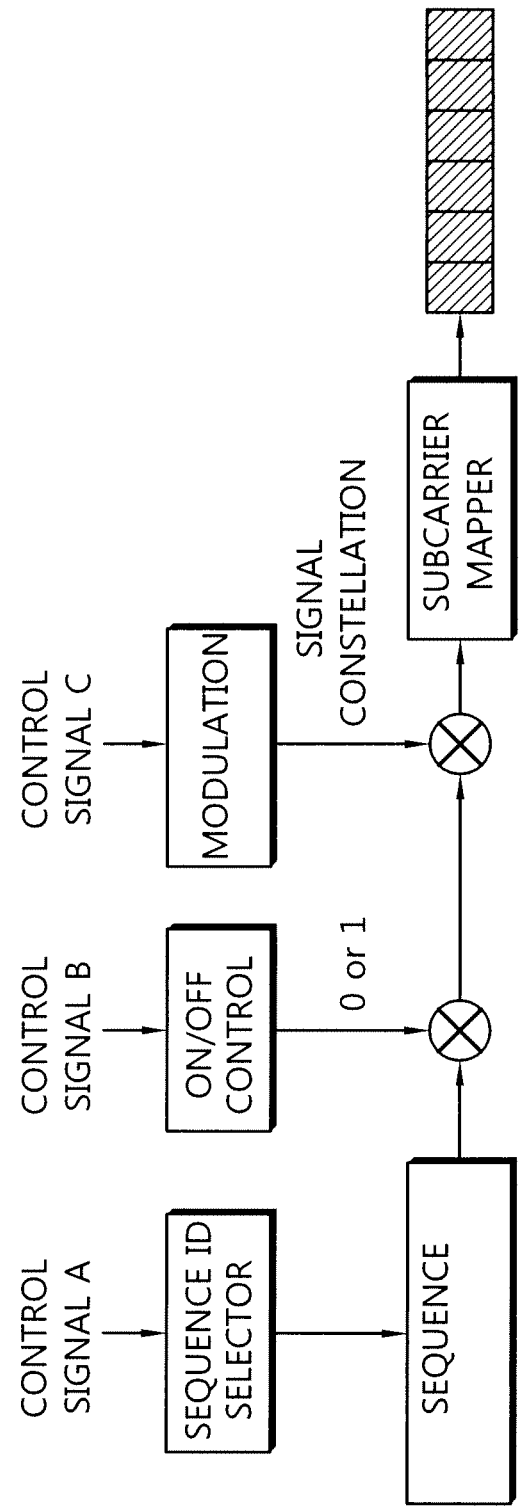
FIG. 14 shows a method of transmitting data through a transmission zone by using six residue resource units of FIG. 13.

FIG. 14 shows a method of transmitting data through a transmission zone by using 6 residue resource units of FIG. 13. Although a control signal is used as the data in this case, the same will also apply to user data transmission.

Referring to FIG. 14, a control signal A, a control signal B, and a control signal C may be transmitted in various combinations through a transmission zone of 6 resource units. The respective control signals may be independent from one another, or may be dependent on one another.

A sequence identifier (ID) selector selects a sequence ID to determine a spreading sequence. The sequence ID itself may be used as information, or may be fixed. The control signal A is spread in bandwidth by using the spreading sequence.

The control signal B becomes bit information indicating '0' or '1' through On/Off control. The On/Off control may be fixed to 'On' always.

The control signal C becomes modulation information corresponding to a signal constellation by performing modulation. A modulation level may be fixed to '1'. Further, the modulation level may be implemented with a differential modulation between sequences. Furthermore, the modulation level may be implemented with scrambling between sequences.

The control signals A, B, and C subjected to the aforementioned processes are mapped in various combinations by using a subcarrier mapper. The combination of the control signals is mapped to a transmission zone of the 6 residue resource units by means of the subcarrier mapper.

Figure 15:
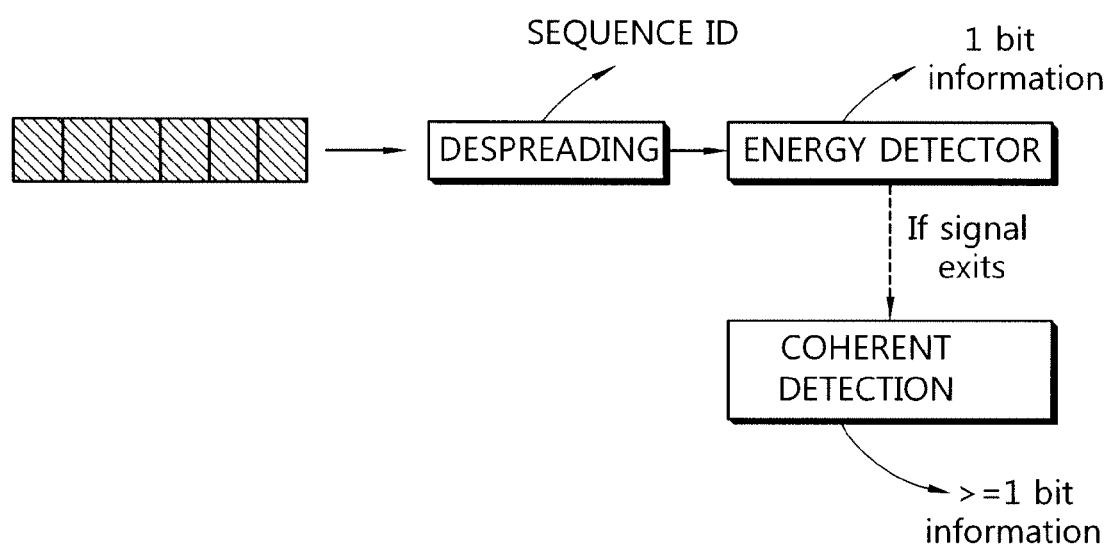
FIG. 15 shows a method of restoring data from a received signal transmitted through a transmission zone of six residue resource units.

FIG. 15 shows a method of restoring data from a received signal transmitted through a transmission zone of 6 residue resource units. Although a control signal is used as the data in this case, the same will also apply to transmission of user data.

Referring to FIG. 15, the received signal may be subjected to de-spreading to restore a sequence ID. After de-spreading, 1-bit information may be restored by means of an energy detector. 1-bit (or more bits) information may be restored through coherent detection. The 1-bit (or more bits) information may also be restored through non-coherent detection. The sequence ID, energy, or modulation information may be a control signal or user data or the like.

As such, when some of pilot resources are not used among a plurality of pilot resources allocated for pilot transmission, data transmission using the some of pilot resources may include a method of transmitting the data directly to a subcarrier through data modulation, a method of indicating the data by selecting a sequence ID, a method of using a residue zone of cyclic shift, a method of indicating the data through energy detection, a method of using an additional spreading sequence, a method of using a cover sequence in the existing pilot sequence, etc.

(2) When a Plurality of Pilot Resources Use the Same Subcarrier

When a plurality of pilot resources use the same subcarrier, in order to distinguish pilots transmitted through respective antennas, specific pilot sequences are allocated to the respective antennas. If an unused pilot sequence exists in this case, the unused pilot sequence may be utilized for information delivery. Hereinafter, a pilot resource such as the unused pilot sequence is called a residue pilot resource. The residual pilot resource may be used to deliver additional data. The additional data may be user data or control information. Although the residue pilot resource is defined as an actual pilot resource, it may be a resource which is generated because pilot resources are not used by the maximum number of antennas. Further, the residue pilot resource may be an additional pilot resource. In addition to the sequence defined as the existing pilot resource, more sequences may be defined as a pilot resource. In this case, an additionally defined sequence may be regarded as the residue pilot resource. Such a case may occur in a structure in which a cell environment is remarkably different, similarly to a difference between a femto cell and a macro cell. The macro cell assumes a delay spread of about 5 µs, but the femto cell has a delay spread much smaller than 1 µs. When defining a sequence in this case, more circular shifted sequences may be generated from a smaller delay spread. In an uplink pilot structure used in 3GPP LTE, a basic resource unit is 12 subcarriers, and among them, 8 cyclic shifts are used. However, it is difficult to utilize all of the cyclic shifts in the macro cell, whereas the femto cell experiences a channel condition in which 12 cyclic shifts can be all used. Therefore, a sequence that can be additionally generated in the existing pilot structure may be utilized as the residue pilot resource. Unlike this, a configuration of the residue pilot resource may be used by separately defining an additional sequence even if a specific interference occurs in addition to a sequence defined as the pilot resource. The newly defined sequence is easily used when the pilot resource is based on a high spreading gain, and a sequence may be added in such as manner that a sufficiently low mutual interference is maintained. If more sequence resources can be generated by using an orthogonal sequence or a low cross correlation sequence, additional data can be transmitted together with the existing pilot sequence. FIG. 14 and FIG. 15 may apply to a data transmission method and a data restoration method.

As such, a residue pilot resource not used in pilot transmission may be used in data transmission, thereby effectively using limited radio resources. In addition, the residue pilot resource may be used in control signal transmission in which an information amount is small. In this case, there is no need to additionally allocate a resource required for control signal transmission, and thus an allocation overhead can be decreased. Accordingly, overall system capability can be improved. A configuration for transmitting actual data may have a data transmission format using a corresponding pilot resource through a residue antenna. In addition, it may be configured as data transmission using a corresponding pilot resource through an antenna for transmitting the pilot. That is, when data is transmitted using the residue pilot resource, a previous definition on a pilot resource and a physical antenna may change.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A data transmission method in a wireless communication system, comprising:
   allocating a plurality of pilot resources for supporting pilot transmission through a plurality of antennas; and
   if there are residue pilot resources not used in the pilot transmission among the plurality of pilot resources, transmitting data by using the residue pilot resources,
   wherein the step of transmitting of the data comprises:
   generating spreading data whose bandwidth is spread by using a spreading sequence;
   mapping the spreading data to the residue pilot resources; and
   transmitting the spreading data.

2. The data transmission method of claim 1, wherein the residue pilot resources include an orthogonal frequency division multiplexing (OFDM) symbol and a subcarrier.

3. The data transmission method of claim 1, wherein the data include control information.

4. The data transmission method of claim 1, wherein the data include an acknowledgement (ACK)/negative acknowledgement (NACK) or a channel quality indicator (CQI).

5. The data transmission method of claim 1, wherein the spreading sequence is a pilot sequence corresponding to the residue pilot resources.

6. A data transmission method in a wireless communication system, comprising:
   allocating a plurality of pilot resources for supporting pilot transmission through a plurality of antennas;
   if there are residue pilot resources not used in the pilot transmission among the plurality of pilot resources;
   dividing the residue pilot resources into a first transmission zone and a second transmission zone;
   mapping first data whose bandwidth is spread by using a first spreading sequence to the first transmission zone;
   mapping second data whose bandwidth is spread by using a second spreading sequence to the second transmission zone; and
   transmitting each of the first data and the second data.

7. The data transmission method of claim 6, wherein the first spreading sequence and the second spreading sequence are orthogonal to each other.

* * * * *